July 29, 1958 E. A. FUGLIE 2,845,248
NON-STICKING LEAK-PROOF VALVE
Filed Sept. 9, 1954
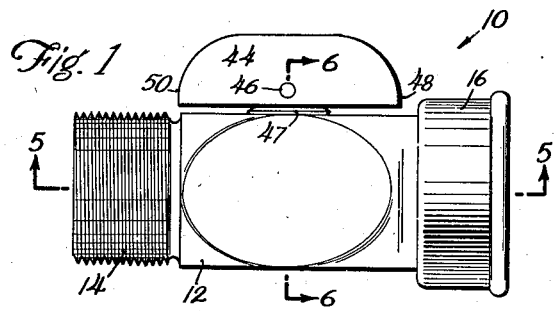
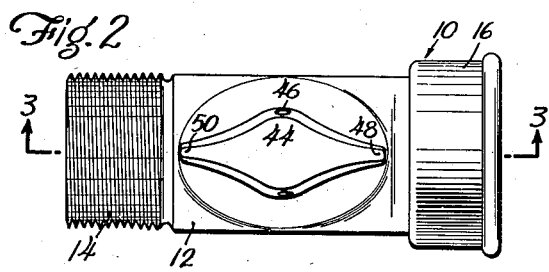
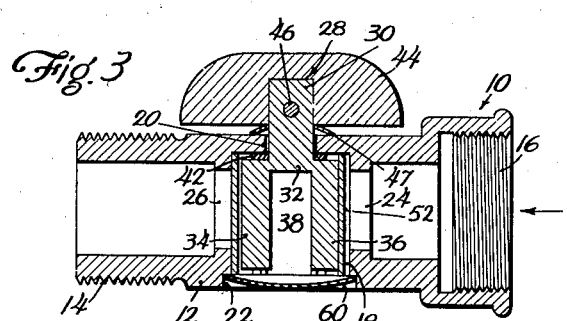
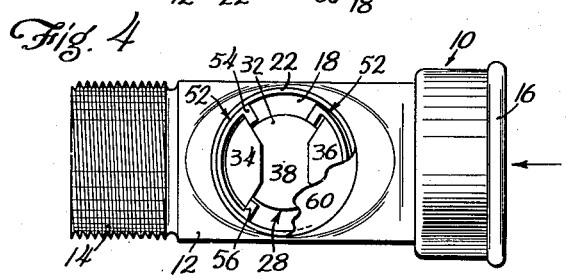
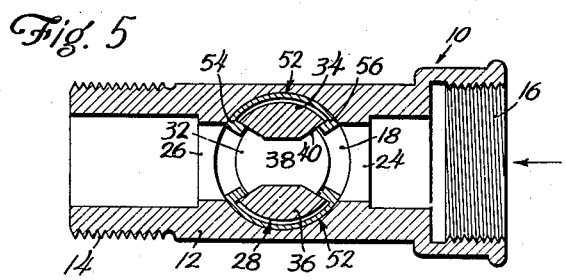
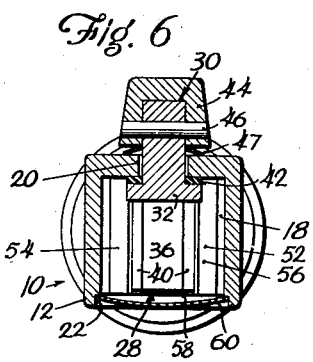
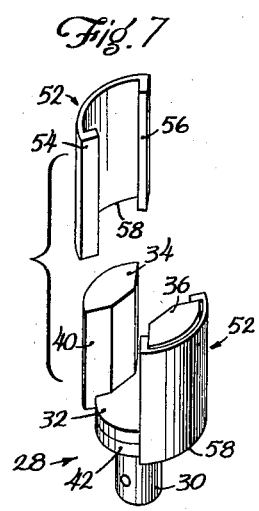
INVENTOR
Elmer A. Fuglie
BY Whitely and Caine
ATTORNEYS United States Patent Office 2,845,248
Patented July 29, 1958

2,845,248
NON-STICKING LEAK-PROOF VALVE

Elmer A. Fuglie, Winona, Minn., assignor to Winona Tool Manufacturing Company, Winona, Minn., a partnership Application September 9, 1954, Serial No. 454,999

2 Claims. (Cl. 251—175)

This invention relates to improvements in a non-sticking leak-proof valve or stop cock. While the valve may have general utility in controlling the flow of fluids under pressure, it is particularly adapted for use with liquids containing a sufficient amount of corrosive substance to normally attack metal parts of a valve, thereby causing leakage or sticking of the movable parts of the valve. In particular the valve is intended for use between sections of a garden hose to control the flow of water to a sprinkling device, and therefore it is desirable to provide a valve which can be easily operated and which is secured against both internal and external leakage.

In the construction of simple valves or stop cocks for controlling the flow of fluids under pressure, such as water, it is desirable to have a valve core which can be easily turned, but which when in a closed position is assured against internal leakage. When such valves are used with water containing a relatively large amount of naturally occurring corrosive material, the valve parts are subject to attack, causing internal leakage or sticking of one part of the valve mechanism relative to the other, so as to prevent the easy rotation of the valve between "on" and "off" positions.

To overcome the difficulty caused by corrosive materials in water, I have discovered that if some of the valve parts are composed of a material which is free from attack by the corrosive substances, the valve remains in good operating condition and is free from sticking. While there are probably many different forms of materials that are neutral to corrosive materials, I have found that a synthetic plastic such as "nylon" is a particularly desirable form of material because it is resistant to corrosives and will form a good bearing surface with coacting of the valve casing surface. While the entire core of the valve might be composed of "nylon" or other equally suitable plastic, there must still be some space between the valve core and the cavity to permit rotation of the core between "on" and "off" positions.

In my co-pending application, Serial No. 363,101, now Patent No. 2,738,158, granted March 13, 1956, is disclosed one way of overcoming leakage in a valve by providing a core which is capable of some lateral movement but whose outer surface conforms with the inner surfaces of the cavity so as to present a true sealing surface. In the present application a non-metallic substance in the form of pliable shields are interposed between the core and the cavity, and these shields serve the dual purpose of resisting corrosion and providing a somewhat flexible surface which when subjected to fluid pressure will conform to the curvature of the cavity and flexibly close off the outlet opening, thereby preventing leakage through the valve.

In the present disclosure the valve core has been provided with a transverse passage in the form of a broad kerf extending transversely through the core from one end in the direction of the other, and bevelling the edges of the remaining portions of the core so as to form in effect laterally spaced segmental portions that are separated by the transverse passage and each capable of fully closing a port opening in the casing. About each of the segmental portions is disposed an arcuate shaped shield composed of "nylon" and whose lateral extremities are bent to extend about the bevelled edges of the segments and whose vertical limits are greater than those of the segments to prevent a metal-to-metal contact between the core and the cavity. In this manner a flexible plastic facing is provided between the core and the cavity and each of the so-called shields are loosely held on their respective portions of the core so as to be capable of slight flexible movement. By turning the lateral edges of the shields inwardly assurance is had that the shields will adhere with the segmental sections. When the valve is in a closed position and pressure is being exerted, the shield covering the outlet opening is capable of flexing against the surrounding portions of the cavity to securely seal the outlet. The valve core and its protecting shields are inserted into the cavity through a large opening in one side of the valve body and a suitable sealing plug is provided to close this opening and contact the lower edges of the plastic shields so as to prevent any adherence between the core and the sealing plug.

An object of the invention is to provide a simple valve or stop cock composed of a pair of relatively movable coacting members, one of which is composed of a synthetic plastic to form cooperating non-sticking surfaces.

Another object is to provide a simple valve composed of a casing containing a cavity and an outlet opening, a core structure adapted to fit within the cavity, and a flexible plastic liner between the casing and the core which is resistant to corrosives and is capable of flexibly enclosing the outlet opening in the casing.

Another object is to provide a simple valve composed of a casing containing a cavity and an outlet opening, a core formed of a pair of separated portions adapted to loosely fit within the cavity, and a flexible plastic shield surrounding each of the spaced portions which will provide a non-sticking surface between the core and the cavity and a flexible closure over the outlet opening.

A further object is to provide a simple valve composed of a casing containing a cavity between inlet and outlet openings, and a core formed of a pair of spaced segmental portions each of which is surrounded by an arcuate shaped shield composed of "nylon" or the like forming a flexible non-sticking surface between the core and the cavity, and a closure plug which encloses the base of the core and engages the lower edges of the shields to form a non-sticking leak-proof valve.

Other and further objects may become apparent from the following description and claims, and in the appended drawings in which:

Fig. 1 is a side elevation of the complete valve;

Fig. 2 is a top view of the valve shown in Fig. 1;

Fig. 3 is a longitudinal section taken on line 3—3 of Fig. 2;

Fig. 4 is a plan view of the bottom of the valve with portions broken away to show interior structure;

Fig. 5 is a sectional view taken on line 5—5 of Fig. 1, but with the valve in an "open" position;

Fig. 6 is a sectional view taken on line 6—6 of Fig. 1; and,

Fig. 7 is a perspective view of the valve core in an inverted position with one of the shields removed and suspended above a portion of the core.

Having reference to the several figures of the drawing, the invention will be described in detail. General reference numeral 10 indicates in its entirety a simple valve composed of casing 12 with an exteriorly threaded connection 14 at one end and an interiorly threaded connection 16 at the other end. Within the interior of the body, and between its opposite ends is a cylindrical cavity 18 which extends into the body 12 from the lower extremity, and joins a narrow opening 20 through the top of the valve body. A recess 22 surrounds the lower edge of the cavity 18. The cavity 18 is provided with an inlet opening 24 and an outlet opening 26 that communicate with the interior of the connecting portions 14 and 16.

Within the interior of the cavity 18 is a core structure that is indicated in its entirety by the general reference numeral 28 and is best seen in an inverted position in Fig. 7. The core 28 consists of a stem 30 which projects through the opening 20 in the upper portion of the casing, and formed integral with the stem is a cylindrical portion 32 carrying a pair of laterally spaced segments 34, 36 on either side of a transverse passage 38 which is in reality a broad kerf extending upwardly from the lower end of the core 28. The inner sides of each of the segmental sections 34, 36 are bevelled, as indicated by reference character 40. Surrounding the stem portion 30 and forming a seal about the top of the core 28 is a resilient gasket 42 which prevents leakage through the upper opening 20. A handle indicated at 44 is secured to the stem 30 by a pin 46, and as indicated in Fig. 2, a spring washer 47 is interposed between the handle and the body 12. The handle 44 is of a streamlined configuration sloping to curved pointed ends indicated at 48 and 50. The handle 44 extends parallel with the valve body when the passage 38 is at right angles to the openings 24, 26, and is streamlined to prevent it from engaging shrubbery or obstructions if the hose line, not shown, to which it is connected is dragged over the ground.

Valve core 28 is of smaller diameter than the cylindrical cavity 18, and each of the segmental sections 34, 36 carries a thin plastic shield indicated by general reference character 52 on its outer surface. The body of the shield 52 which is composed of "nylon" is of arcuate configuration to loosely fit over sections 34, 36, and its lateral edges indicated at 54, 56 are inwardly turned so as to embrace the bevelled edges 40 of the two segmental sections. As best seen in Fig. 6, the lower edge 58 of the shields extends below the lower extremity of the segmental sections, and engage a welch plug 60 that is sprung into the cavity 22 to form a seal for the lower end of the cavity. The two shields 52 are slidably mountable on the segmental sections, and their lateral edges 54, 56 embrace the bevelled edges of the sections.

The operation of a valve is so simple as to not require any explanation, but it is believed that some explanation should be given realtive to the plastic shields and their actions with respect to the remaining valve parts. Because the shields are composed of "nylon" or other suitable plastic, they are corrosive resistant, particularly to alkaline substances. "Nylon" being a relatively hard plastic gives a good bearing surface with the interior of the cavity and is relatively wear resistant. However, as any core must be rotatable within the cavity there is always the possibility of some leakage of fluid, and the fact that the shields are loosely mounted on the core sections permits a certain degree of movement of the shields relative to the cavity. The pressurized fluid may be capable of leaking through the inlet opening into the transverse passage 38, but if it does it will tend to drive the opposite shield against the outlet opening, and the shield having some flexible movement will conform to the interior curvature of the cavity and form a perfect sealing surface about the outlet opening. On the other hand, if the valve is only partially open the liquid pressure is incapable of flexing the lateral edges 54, 56 of the shield enough to cause separation of these edges from the metal segmental sections, and therefore the shields will not under these circumstances tend to partially block off the opening. Moreover, because the core is smaller than the cavity and the shields are slightly longer than the core and loosely fit about the core sections, the valve may be readily rotated and is not subject to sticking since there is no metal-to-metal contact between the core and the cavity.

The advantages of my invention reside in the provision of a simple valve having flexible interior portions which are capable of making the valve leak-proof when in a closed position, and composed, in part, of materials that are not subject to corrosive attack, and therefore provide a non-sticking valve.

My invention is defined in the terms of the appended claims.

I claim:

1. A valve, comprising a casing containing a cylindrical cavity, said casing formed with a pair of spaced openings communicating with the cavity and constituting an inlet and outlet with respect thereto, a cylindrical core formed with a stem that projects from one axial end of said core and penetrates said casing to provide the only rotative support for said core with respect to said cavity, said core formed with a broad transverse kerf in the oppoiste axial end thereof which extends throughout the major portion of the core and divides said core into two spaced segmental portions each of sufficient arcuate length to close one opening in said casing, and a pair of curved imperforate shields of greater vertical length than said segmental portions and formed with flanged lateral edges loosely mounted on the segmental portions with the flanged edges embracing the limits of the segmental portions and one vertical limit of each shield extending beyond one limit of the respective segmental portion, said shields forming a liner to prevent any metal-to-metal contact between the core and the cavity, said shields being of substantially uniform thickness and consisting entirely of a tough non-tearing plastic material that is impervious to fluids passed through the valve.

2. A valve, comprising a casing containing a cylindrical cavity, said casing formed with a pair of spaced openings communicating with the cavity and constituting an inlet and outlet with respect thereto, a cylindrical core formed with a stem that projects from one end of said core and penetrates said casing to provide the only rotative support for said core within said cavity, a sealing gasket surrounding said stem, said core formed with a broad transverse kerf in the opposite axial end thereof which extends throughout the major portion of the core and divides said core into two spaced segmental portions each of sufficient arcuate length to close one opening in said casing, and a pair of curved imperforate shields of greater vertical length than the segmental portions of the core each embracing the outer surface of one of said segmental portions and extending beyond one limt of said segmental portions and with said sealing gasket precluding any metal-to-metal contact between said core and said cavity, said shields being of substantially uniform thickness and consisting entirely of a tough non-tearing plastic material that is impervious to fluids passed through the valve.

References Cited in the file of this patent

UNITED STATES PATENTS

| 344,172 | Denmead | June 22, 1886 |
| 588,415 | Foster | Aug. 17, 1897 |
| 720,012 | Erdman | Feb. 10, 1903 |
| 1,760,951 | Manifold | June 3, 1930 |
| 2,246,801 | Johnson | June 24, 1941 |
| 2,261,535 | Wheatley | Nov. 4, 1941 |
| 2,649,275 | Noyes | Aug. 18, 1953 |